Patented Nov. 29, 1927.

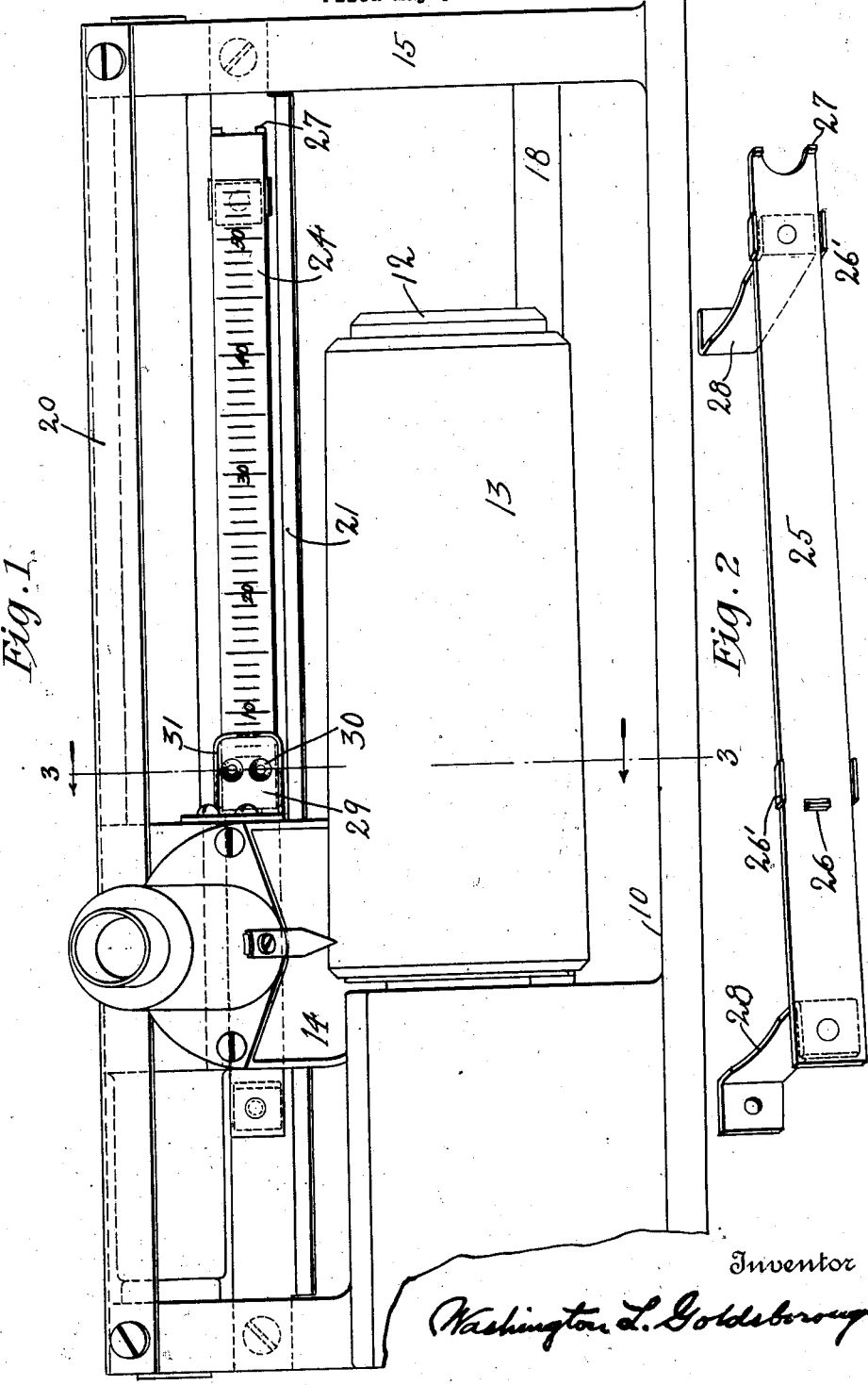

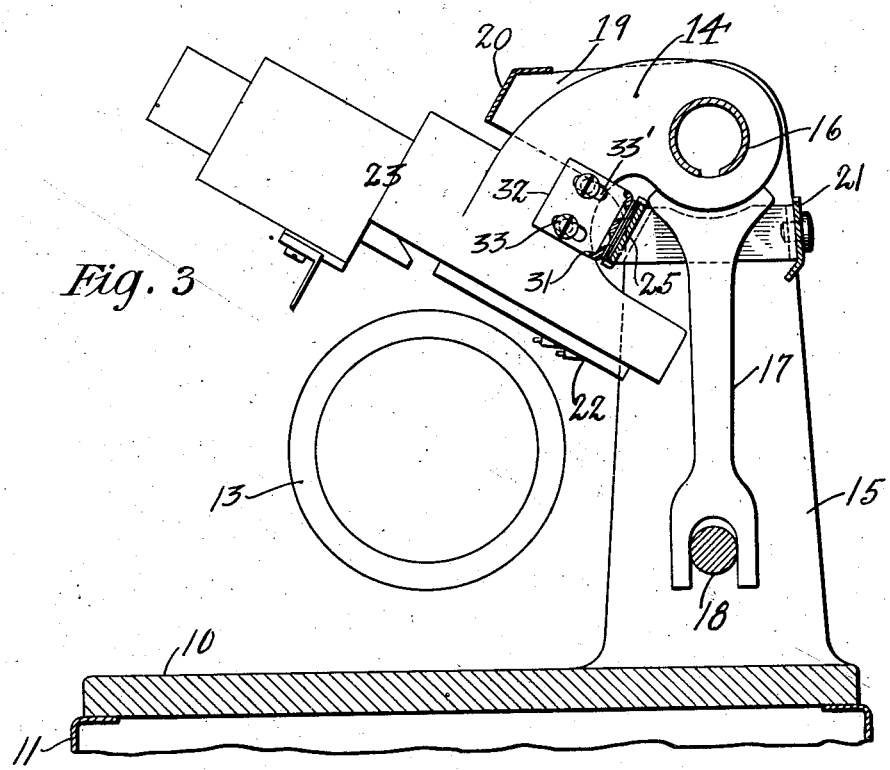
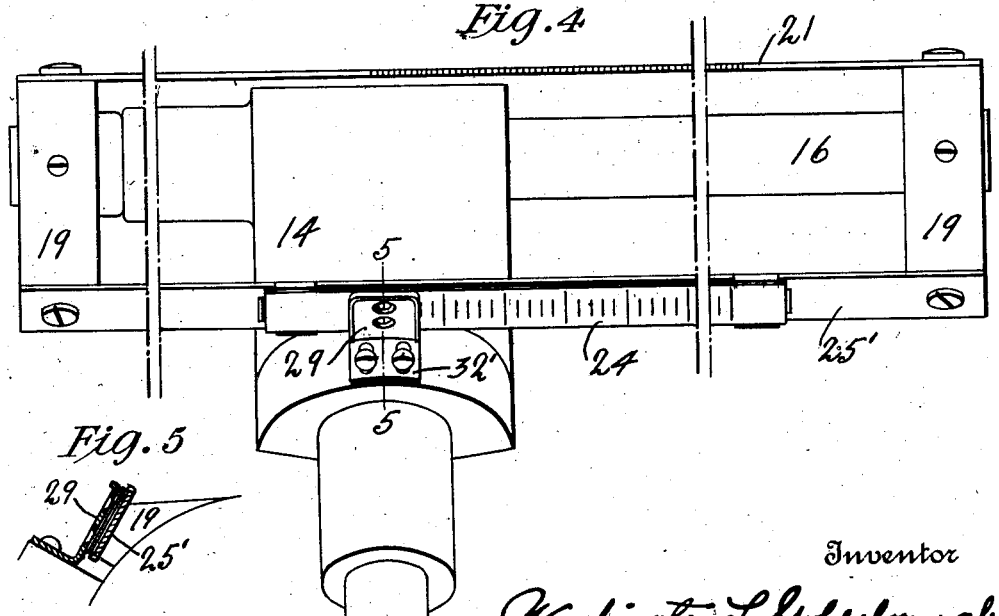

1,651,056

UNITED STATES PATENT OFFICE.

WASHINGTON L. GOLDSBOROUGH, OF NEW YORK, N. Y., ASSIGNOR, BY MESNE ASSIGNMENTS, TO DICTAPHONE CORPORATION, OF NEW YORK, N. Y., A CORPORATION OF NEW YORK.

CORRECTION DEVICE FOR PHONOGRAPHIC MACHINES.

Application filed May 8, 1920. Serial No. 379,699.

This invention relates to correction devices for dictation machines, and has for its object the provision of simplified means for imparting information to the transcriber, and for furnishing to the transcriber an index of the record tablet. Devices for this purpose heretofore proposed have consisted of variations either of the idea of a pointer or guide moving near or over a correction sheet or index member so as to indicate to the eye of the person dictating where on such sheet or member a mark may be made by hand, or of the idea of a mechanically-operated marking means for placing a desired mark on the sheet or member. Neither of these types of devices heretofore proposed have proved satisfactory for a number of reasons, principally, with respect to the pointer or guide devices, that they are cumbersome and require in their operation on the part of the person dictating both a mental and physical effort, and with respect to the mechanically-operated marking means, that they are also cumbersome, and tend to get out of order, requiring constant attention and repair to keep them operative.

It is an important object of this invention to provide a correction device for dictation machines which avoids the defects of the two types of devices above discussed by enabling the person dictating to make the desired indication by hand without the necessity of looking at the correction sheet to assure himself that the indication has been accurately placed.

The invention is capable of receiving a variety of mechanical expressions, two of which are shown on the accompanying drawings. It is to be expressly understood, however, that the drawings are for the purposes of illustration only, and are not to be construed as a definition of the limits of the invention, reference being had to the appended claims for that purpose.

In the particular embodiments of the invention, herein disclosed, the correction device comprises a support for a stack or pad of superimposed correction strips, a plate movable longitudinally above the strips and in close proximity thereto, and having inwardly tapered or countersunk holes, which circumscribe points of the strip beneath the plate to be marked, said holes being adapted to guide an inserted pencil or other marking member into engagement with the strips, at the points defined by the holes, the plate being arranged to have movement with the sound-box, relative to the strip, in proportion to the relative movement between the sound-box and the record tablet. In some aspects, considerable advantage is gained by having the plate mounted upon the sound-box rather than anywhere else; but in others, it is not so important that this be done, so long as the support for the index and the plate have relative movement in proportion to the relative movement of the record-tablet and the sound-box.

In order that the invention may be more fully understood reference should be had to the accompanying drawings in which Fig. 1 is a front elevation of a well-known form of phonographic machine showing the improved correction device in place thereon, the support for the index member projecting forwardly from the rear of the machine to a position adjacent to the sound-box;

Fig. 2 is a view in perspective of the index member support;

Fig. 3 is a cross-section taken on line 3—3 of Fig. 1;

Fig. 4 is a plan view of the machine shown in Figs. 1 and 2, showing an alternative location of the correction device; and Fig. 5 is a section taken on line 5—5 of Fig. 4.

Only so much of the phonographic machine is shown as will suffice to show the application of the invention thereto.

The base 10 of the machine is supported on a motor box 11 containing mechanism (not shown) for imparting rotation to the mandrel 12 on which the record tablet 13 is mounted, and for moving the sound-box carriage 14 longitudinally thereover.

Rising from the base of the machine at either end thereof is a pair of standards 15. Extending between these standards is a slotted tube 16 along which the carriage 14 is movable. This tube is adapted to contain a screw shaft (not shown) for causing traveling movement of said carriage axially of the cylindrical tablet 13. The carriage is prevented from rotating on said tube by means of a depending stabilizer arm 17 which is bifurcated at its lower end to straddle a rod 18 extending between said standards.

Extending forwardly from each standard 15 at the top thereof is an arm 19 for supporting what is ordinarily a scale bar 20 and along which a pointer (not shown) is adapted to move as the carriage travels.

Extending between the standards 15 at the rear thereof and somewhat below the slotted tube 16 is a bar 21 having teeth on its upper edge. This bar is commonly known as a back spacer bar, and means (not shown) carried by the carriage are adapted to cooperate with the bar for imparting step-by-step movement to the carriage.

The carriage carries a suitable sound box 22 which is in communication with a chambered head 23 to which a speaking tube (not shown) is adapted to be connected.

The construction thus far described is the usual and familiar construction of a dictation machine well known in the art.

In carrying out my invention I support the correction strip or index member 24 on a table 25 of comparatively narrow width and for securing said member or strip in place on the table any suitable means may be provided. As shown in Fig. 2, the table may be provided with a stamped-up lug 26 against which one end of the strip may abut and side flanges 26'. The right hand end of the table may be bent up as at 27 to provide the other abutment.

The correction strips are preferably provided with graduated scale markings from zero to fifty-five, for example, corresponding to the scale markings usually provided upon the scale bar 20. The correction strips may be provided singly, or there may be a plurality of them in stack or pad form.

As shown in Figs. 1 and 3, the table 25 may be arranged within the rearwardly and downwardly facing opening or pocket in the sound box carriage. The table is supported in this position by means of brackets 28 secured to the back-spacer rack-bar 21. Any other suitable or preferred table support may, of course, be employed without departing from the spirit of the invention.

The means permitting indicia or marks to be made on the index member will now be described. Secured to the sound-box carriage at one side thereof is a cover or plate 29 having openings 30 therein through which the underlying index member may be reached by a free hand-held marker in the form of a pencil or other pointed instrument. These openings are preferably circular and of gradually decreasing diameter downwardly—i. e. funnel-shaped to enable accurate and quick centering of the marking tool without special effort on the part of the operator. As a further aid to the operator, it is preferred to provide the cover or plate with a raised or flanged edge 31 thus providing a trough or basin-like top which serves to prevent the marking tool from slipping off the cover prior to its insertion in an opening 30. In the drawing two of such openings are shown, but if necessary or desirable, one, three, or more may be provided depending on what information is desired to be transmitted to the transcriber. The most common information concerns lengths of letters, rush and corrections in the dictated matter. The openings in the cover may be arranged in stepped relation when more than two are desired, the main consideration being that they shall be in transverse spaced relation to allow the making of a plurality of marks or indicia on the index member. After an indication is made upon the index member 24 by inserting a marker or pencil through the openings 30 of the cover 29, such indication may be accurately located and registered with the point—i. e. the longitudinal position—on the record-tablet at which an instruction, such as the beginning or ending of matter, or a correction or the like, is made, by bringing the openings 30 into visual register with the mark upon the index member. Inasmuch as this mark can be centrally located in the opening 30 and will be clearly visible when the opening is brought into such position with respect to, or over, the mark, or vice versa, a very convenient means is provided for re-locating any point upon the record-tablet at which an indication has been made, or to correspond with the indication which has been made on the index member, to locate the point indicated on the record-tablet. In referring to this "point indicated on the record-tablet", it is, of course, understood that this point is the longitudinal position at which the correction or other indicia appears on the record; this may either be audibly indicated, as by the dictator's words reproduced in the record tone-lines at that particular point, or the indication may be made solely upon the index member when dictating the record at that point—as, for instance, in showing the beginning of another letter or other instruction.

The cover 29 is preferably mounted for movement toward and away from the table 25 to allow it to ride over the index member on the table. When a pad of such members is supported on the table the cover automatically adjusts itself to the thickness of the pad. The cover is secured to the sound-box carriage by means of an angled extension 32 through which screws 33 are passed into the body of the carriage the screws passing through parallelly arranged slots 33' in said extension. Inasmuch as the slots are inclined toward the table 25, the cover will drop by gravity into contact with the index member 24. It will be readily understood, however, that spring pressure may be employed to perform the same function.

While in Figs. 1 and 3 the table is shown in the downwardly and rearwardly inclined opening in the sound-box carriage, it will be readily apparent that the invention is not limited to such location. It may for example occupy the position of the normally-provided scale bar 20, shown in Figs. 1 and 3. In Figs. 4 and 5 the table 25' is shown in such position and as supported by the arms 19 instead of the brackets 28. The cover 29 is then arranged on the upper part of the head 23 of the sound-box carriage, the extension 32' being in such case curved to correspond to the curvature of the head as will be readily understood.

It will now be observed that the inclination of the tables 25 and 25' is such as to be at right angles to the line of sight and that such inclination is at right angles to the long axis of the chambered head 23. It will therefore be appreciated that the marking instrument may be brought to the cover both accurately and naturally by merely moving it along the line of sight. This is an important advantage of the present invention since it reduces to a minimum the care and thought necessary to perform the operation of entering indicia on the index member.

In operation, the correction strip is positioned in the support, so that the zero line of the scale markings lies under the holes or openings in the metal plate, when the sound-box is in a position to begin its passage over the record-tablet. If, during the passage of the sound-box over the record-tablet, the person dictating desires to indicate to the transcriber some instruction, relative to a correction or the like, a pencil or other marker is inserted in the proper hole 30 in the metal plate 29, thus making a mark at the desired point on the underlying correction strip.

The present correction device has the further advantages of being simple in construction and easy of application to existing machines and of harmonizing with the lines of a present well-known phonographic machine.

While the invention has been described with considerable detail, it is to be understood the appended claims are intended to define the limits of the invention.

What is claimed is:

1. In a phonographic machine, an index device for use with index members to indicate noted positions of a traveling sound-box carriage comprising a plate attached to the sound-box carriage so as to follow the surface of the index member and adapted to travel over said index member, said plate having a raised marginal edge and being provided with holes to permit said index member to be reached by a free hand-held marker.

2. In a phonographic machine, the combination with the traveling carriage thereof, of an index member supported by the frame of the machine, a cover or plate adapted to slide over said index member as the carriage travels, said cover being attached directly to said carriage for bodily movement toward and from said index member and being adapted to permit said index member to be reached by a free hand-held marker, and also adapted to visually register the markings upon the index member with the points of instruction indicated upon a record-tablet.

3. In a phonographic machine, means adapted to overlie an index member above the sound-box of the machine, said means comprising a cover or plate having an angular extension for attachment to an element of the machine, said cover being adapted to have bodily movement toward and away from the index member in constant parallel relation thereto and being provided with openings to permit a free hand-held marker to reach the index member, the openings adapted to visually register the markings upon the index member with the corresponding relative points indicated upon a record-tablet.

4. In a phonographic machine, means adapted to overlie an index member, said means comprising a cover or plate having an angular extension for attachment to an element of the machine, the cover being provided with an upwardly directed marginal flange, said cover being adapted to permit the underlying index member to be marked by a free hand-held marker.

5. In a phonographic machine, the combination of an index and a member having relative movement in proportion to the relative movement of the record-tablet and sound-box of the machine, said member lying over the index and being provided with an opening to permit the index to be reached by a free hand-held marker, said opening being circular and circumscribing a point upon the index to be marked the marking upon the index adapted to be visually registered with the opening to locate the point of instruction indicated upon the record-tablet.

6. In a phonographic machine, an index member, a cover in the form of a trough adapted to travel over said index member and having an aperture to permit the insertion of a marker, such as a pencil, to indicate on the index member a point corresponding to a point on the record-tablet.

7. In a phonographic machine, the combination of an index member and a cover having relative movement in proportion to the relative movement of the record-tablet and sound-box of the machine, said cover extending laterally from the sound-box, lying over the index member and having an unobstructed opening through which a pencil or the like may be inserted.

8. In a phonographic machine, an apertured cover having a right angular extension for attachment to a movable element of the machine, said aperture being adapted for the insertion of the free hand-held marker, and an index member over which the cover is movable and upon which a mark is made to indicate a point of instruction on a record-tablet.

9. A correction device for dictation machines, comprising the combination with an index strip of a length substantially corresponding to the length of travel of the sound-box of the machine, and an angular plate having an apertured portion extending laterally to the axis of the sound-box and provided with walls designed to prevent displacement of a free hand-held marker therefrom, when placed thereon, and to direct the marker into and through the aperture to indicate on the strip positions on a record-tablet at which instructions are desired or made.

10. A phonographic dictation machine, comprising the combination with a record-tablet, a sound-box carriage, a sound-box carried thereby and having a stylus, a strip over the path of which the sound-box carriage moves, and a plate carried by and movable with the sound-box carriage and provided with a freely open aperture, said plate and its attaching part lying wholly over the strip.

11. In a correction device for dictation machines, an angular plate having a trough-like horizontal portion provided with a counter-sunk hole.

12. A correction device for phonographic machines, including a plate adapted for attachment to the sound-box carriage of a phonographic machine, and adapted to move over an index sheet or strip placed therebeneath, said plate being in the form of a trough and having an opening therethrough provided with a wall adapted to direct a pencil or other free hand-held marker through the opening.

13. A correction device for phonographic machines, including a cover member adapted for attachment to the sound-box carriage of the machine, and provided with a tapered opening therethrough, and means for preventing the displacement of a pencil or other free hand-held marker upon the same, and a correction sheet arranged beneath the cover and accessible for marking throughout the length of travel of the carriage.

In testimony whereof, I affix my signature.

WASHINGTON L. GOLDSBOROUGH.